United States Patent [19]
Bertotto

[11] Patent Number: 5,840,635
[45] Date of Patent: Nov. 24, 1998

[54] TRANSPORT AND SUPPORT MEANS FOR HEAVY, HIGH TEMPERATURE ARTICLES AND ITS MANUFACTURING PROCESS

[75] Inventor: Serafino Bertotto, Como, Italy

[73] Assignee: Industrie Tessili Bresciane S.P.A., Merone, Italy

[21] Appl. No.: 733,797

[22] Filed: Oct. 18, 1996

[51] Int. Cl.⁶ .................................................. B32B 5/02
[52] U.S. Cl. .................. 442/270; 156/149; 428/36.2; 442/189; 442/192; 442/208; 442/209
[58] Field of Search ..................... 442/189, 192, 442/208, 209, 270; 428/36.2; 156/149

[56] References Cited

U.S. PATENT DOCUMENTS

| | | | |
|---|---|---|---|
| 4,489,125 | 12/1984 | Gagnon | 428/235 |
| 4,604,310 | 8/1986 | Bertotto | 428/36 |
| 4,798,760 | 1/1989 | Diaz-Kotti | 428/234 |
| 5,110,672 | 5/1992 | Zehle et al. | 428/234 |

FOREIGN PATENT DOCUMENTS

| | | |
|---|---|---|
| 0375369 | 6/1990 | European Pat. Off. . |
| 2057966 | 4/1981 | United Kingdom . |

*Primary Examiner*—James J. Bell
*Attorney, Agent, or Firm*—Bucknam and Archer

[57] ABSTRACT

A transport and support means for heavy, high-temperature articles (5) which includes:

(a) a flexible support base made of at least one weft woven fabric, one or more ply, using rigid, synthetic monofilaments with a diameter of between 0.1 and 1.0 mm and warp woven using parallel, twisted or braided synthetic multifilaments. The aforementioned mono and multifilaments have a heat resistance of at least 150° C. and the aforementioned base has been treated with a silicon rubber of a heat resistant vulcanised resin:

(b) a veil or layer (4) of synthetic, staple, heat-resistant fibres needles on at least one surface of the flexible support base.

The transport and support means is thermostable and compact having been pressed at a temperature of 150°–260° C. and at a pressure of between 5 and 50 kg/cm².

15 Claims, 2 Drawing Sheets

TRANSPORT AND SUPPORT MEANS FOR HEAVY, HIGH TEMPERATURE ARTICLES AND ITS MANUFACTURING PROCESS

"A transport and support means for heavy, high temperature articles and its manufacturing process", under the name of: INDUSTRIALE TESSILI BRESCIANE S.p.A.

DESCRIPTION

The herein invention pertains to a transport and support means for heavy, high-temperature articles and to its manufacturing process.

In particular, the herein invention refers to a transport and support means for heavy, high-temperature articles which is particularly adapt for use on cooling benches, in extrusion moulding plants or in the casting of non-ferrous materials such as aluminium, glass, etc., in the heat treatment process of glass, ceramics, etc. or in the transport of hot silica sand for the "shell moulding" process in the electrometallurgical industry, as well as in the heat printing process of textiles or other materials.

The term "transport and support means" as used in the description and in the Patent Claim includes the loop belts used to transport extruded aluminium products from the extruder head or moulded glass from the mould, as well as to transport the aforementioned through the various production or working processes, to transport hot silica sand and to transport and support textiles and other materials in the heat printing processes, as well as pads, tubes and/or rollers as used on extruding benches or as spacers in the production of extruded aluminium products and in the heat-treatment process in the ceramic industry.

As is widely known, hot aluminium bars, on coming out of the press extruder head, are collected on a number of benches which then transport the extruded items through the various production stages, such as cooling, stretching, etc., at right angles to the extruding direction. While the extruded product is transported away from the extruding head and transferred from one process stage to another the product gradually cools down from a typical initial temperature of approximately 550°–600° C.

Each bench includes: two rollers, of which one is a drive roller, a support plate positioned between the two rollers and a conveyor belt placed around the rollers and plate which supports the extruded product.

Given its role, there are many characteristics required of this belt some of which include: high temperature resistance, low heat transfer, high density to transport heavy and high-temperature products, good tracking, smooth surfaces so as not to cause pits or scratches on the surface of the hot extruded product, adequate friction coefficient as to avoid slipping on the pulleys, dimensional stability under the combined action of heat and pressure, reduced hygroscopic properties, slower cooling times at working temperatures, no released gas during heat decomposition, reduced or zero elongation to avoid slipping on the driven pulleys, etc.

The various kinds of technical, textile materials used or proposed for such uses do not give the aforementioned required characteristics. For example, we know of belts consisting of various overlaid layers of fabrics made of heat resistant fibres, generally aromatic polyamide fibres (aramidics) such as Kevlar, which are then sewn together and whose ends are joined to form a loop. There belts have a number of drawbacks which limit their uses and life. For example, they fray since the fabric fibres are cut by the sharp edges of the extruded bars. This fraying, in turn, damages the extruded bars owing to the rough fabric surface and the sewn seam. The belts undergo high elongation thus causing sagging and side movement during running so that they will override the guide plates.

We also know of belts which consist of a support base or element made of one or more ply of polyester fabric. A cushion pad on non-woven fabric made of heat-resistant fibres is then glued onto the support. These belts are made tubular (endless) by sewing together both the support ends and the ends of the cushion pad.

These belts allow one to solve some of the drawbacks pertaining to purely fabric belts, for example, fraying and rough fabrics, but they still have a seam which consequently damages the transported product, they sag, elongate and curl up at the edges thus causing side movement and imperfect belt running on the transport rollers and support plate.

We also know of conveyor belts which are made of a flexible fabric base made of fibres with a heat resistance of at least 150° C. and a layer or veil of heat-resistant fibre quilted or needled to at least one surface of the support fabric. The flexible base fabric and the fibre layer form a single body with the fibre layer on one side and the fabric base on the other side. The base fabric side is preferably impregnated and covered with a heat resistant resin so as to increase the friction coefficient between the transport rollers and the conveyor belt. The fabric base is weft woven using heat resistant fibre threads, such as e polyparaphenylen-perephthalamide fibre, known on the market under the trade name Kevlar, and warp woven using polyester fibres.

However, even these belts have their drawbacks. For example, owing to their low transversal rigidity, at right angles to the running direction, when transporting hot bars these belts tend to slide out of their running grooves and override the sides of the support plates they are running on. During the cooling stage, in fact, the extruded and thermoformed bars retract greatly and this retraction pushes the belts sideways towards the sides of the support plate. The belts curl up at the edges, slide out of their running grooves and override the production plates. This drawback is also due to these belts elongating.

The goal of the herein invention is to eliminate the above drawbacks.

More particularly, the goal of the herein invention is to achieve a conveyor belt which is adapt to the aforementioned uses and which, apart from having the aforementioned characteristics of heat resistance, smooth surfaces, adequate friction coefficient, flexibility, has a high resistance and rigidity at right angles to the running direction so that it does not curl up owing to the pushing effect of the cooling, retracting material being transported.

Pertaining to the herein invention, this and any other goals that may stem from the following description shall be obtained by way of a transport and support means which includes:

(a) a flexible support base made of a woven fabric with a heat resistance of at least 150° C., and
(b) a veil or layer of synthetic staple heat resistant fibres needled to at least one surface of the flexible support base, where the flexible support base is made of at least one weft woven fabric, one or more ply, using rigid, synthetic monofilaments with a diameter between 0.1 and 1.0 mm and warp woven using parallel, twisted or braided synthetic multifilaments and that the aforementioned basis has been treated with a silicon rubber or a heat resistant vulcanised resin.

The support base may be made of either a single wefts woven fabric, one or more ply, using rigid, synthetic monofilaments with a diameter between 0.1 and 1.0 mm and warp woven using parallel, twisted or braided synthetic multifilaments or, preferably, made of a number of fabrics, one or more ply, as aforementioned, overlaid and alternating with synthetic, staple-fibre veils, all needled together.

Any synthetic monofilament on the market with a heat resistance of above 150° C. may be used for the wefts weave to produce the support fabric. Examples of synthetic monofilaments include the polyesters such as polyethylenterephthalate (PET), preferably high strength polyheteroheteroketonic (PEEK) and the polyamides. These products, in general, have a strength of at least 4.5 g/den and a stretching to breaking point of 5–20%.

The multifilaments should preferably be made of continuous staple automatic polyamides, known on the market under the trade names CONEX, NOMEX, KEVLAR, TWARON, used alone or bound together. The support base may be a one or more ply seamless endless fabric or it may be an open-ended.

The number of monofilaments in the weft and multifilaments in the warp is nor critical and may vary within a wide range based on the required mechanical resistance. Preferably, the number of monofilaments will be between 5 and 20 per centimetre, based on the diameter of each fibre; the number of multifilaments (1,000–2,000 den) may vary between 10 and 30 centimetres. In general, it is preferable for the supporting fabric not to be very compact so as to aid penetration of the veil (batt) fibres through the fabric weave during the needling process.

The number of fabric ply is not critical and depends on the required right angle rigidity. This generally varies between 1 and 5.

The synthetic, staple, heat-resistant fibres used to make the veil include both the aromatic polyamides, which are known under the trade name CONEX, NOMEX, KEVLAR, TWARON, and the polybenzimidazoles (PBI) made by the U.S. firm Celanese.

The transport and support means may be thermostabilised by pressurised heat treatment up to 200 kg/cm at a temperature of between 150° C. and the maximum allowable temperature for the least heat resistant fibres.

Furthermore, the aforementioned transport and support means may be compacted in a steam or oil operated press heated to a temperature of 150° to 260° C. at a pressure of between 5 and 50 kg/cm$^2$.

Finally, the transport and support means may be surface ground to obtain a smooth surface and even thickness.

The manufacturing characteristics, the properties and the advantages pertaining to the herein "transport and support means" invention may be better understood from the following detailed description which refers to the attached diagrams which, in turn, represent an example of how to achieve the herein invention, a method which is preferable but not limited to the herein invention. The diagrams include:

The herein invention shall hereinafter be described with particular reference to the manufacture of a seamless, continuous conveyor belt. The same procedure may be applied for the manufacture of pads, rollers, tubes, etc.

Figure 1:
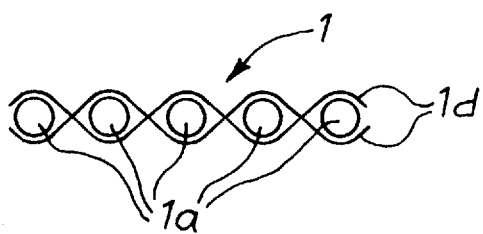
FIG. 1 illustrates a schematic side view of a single ply support fabric.
Figure 2:
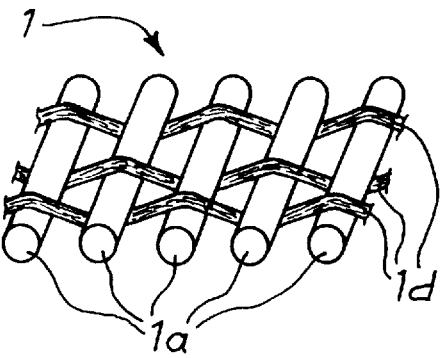
FIG. 2 illustrates a perspective view of the fabric in FIG. 1.
Figure 3:
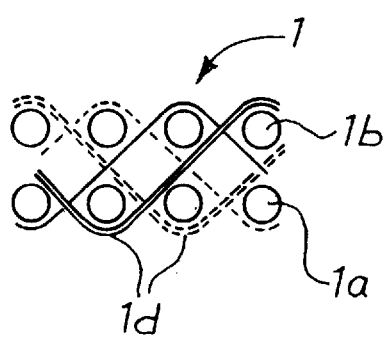
FIG. 3 illustrates a schematic side view of a two ply support fabric.
Figure 4:
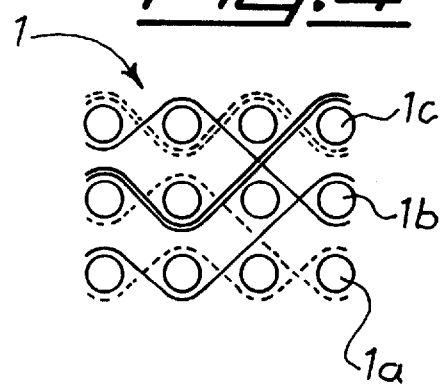
FIG. 4 illustrates a schematic side view of a three ply support fabric.
Figure 5:
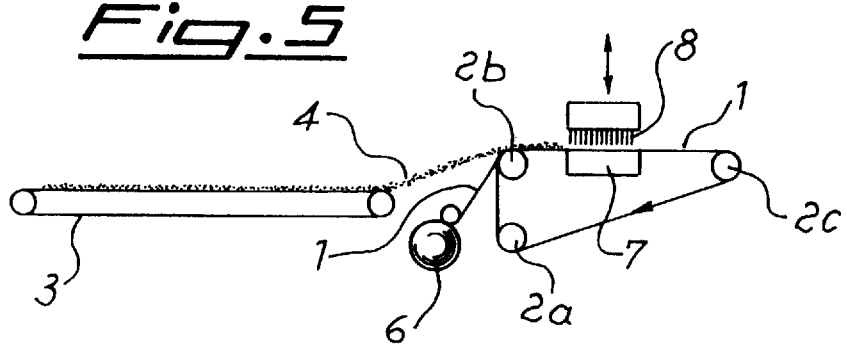
FIG. 5 illustrates a schematic view of the needling process of a staple-fibre veil to a fabric, thus forming a support base made of overlaid, alternating layers of fabric and fibre veils needled together.
Figure 6:
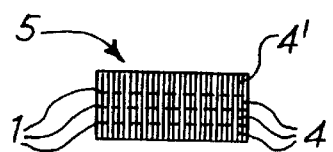
FIG. 6 illustrates a schematic side view of part of the belts pertaining to the herein invention.
Figure 7:
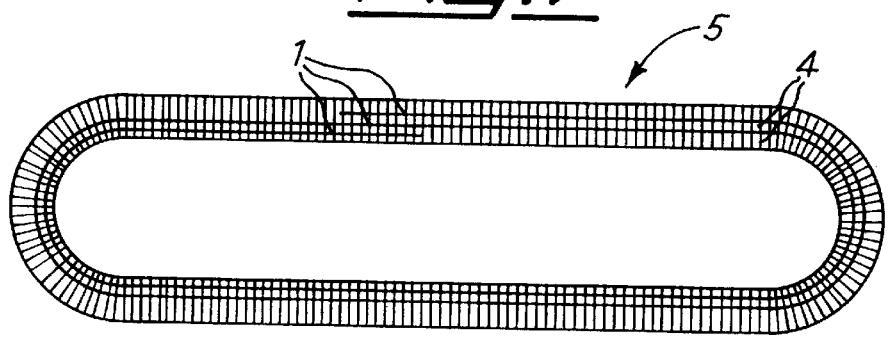
FIG. 7 illustrates a schematic side view of the completed belts pertaining to the herein invention.
Figure 8:
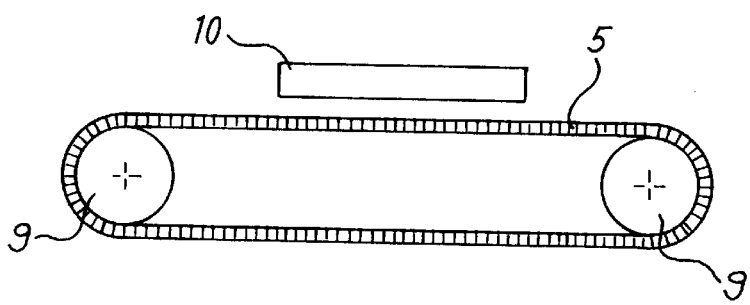
FIG. 8 illustrates a schematic side view of the belt thermostabilising device.
Figure 9:
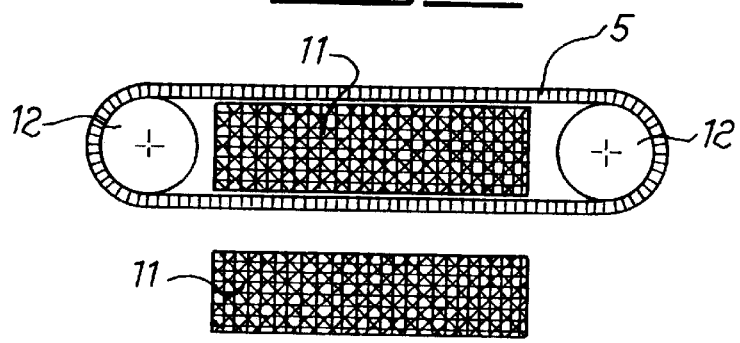
FIG. 9 illustrates a schematic side view of a belt pressing and compacting device.

With reference to the diagrams, the flexible support base for the conveyor belt pertaining to the herein invention may be made of at least one weft woven fabric (1), one or more ply (1a, 1b, 1c), using rigid, synthetic monofilaments with a diameter between 0.1 and 1.0 mm and warp woven using multifilaments (1d). This fabric (1) is manufactured on a shuttle loom in both the endless and open-ended versions. The fabric (1) may be used as such for the support base or, preferably, it may be used by overlaying and alternating layers of the fabric (1) with staple-fibre veils (4). Preferably, there should be from 2 to 4 overlaid layers. FIG. 7 illustrates a support base made of two layers of fabric (1) and two layers of staple-fibre veil (4).

The support base, made of alternating, overlaid layers of fabric (1) and staple-fibre veils (4), is achieved by feeding the fabric (1) from a roll (6) onto the stretching rollers (2a, 2b, 2c) and laying the staple-fibre veil (4) from a lapping machine (3) onto the fabric (1). The rollers should be set at the distance required from the to the other to obtain the belt circumference required.

The fabric (1) and the staple-fibre veil (4) are wrapped around the rollers (2a, 2b, 2c) once or twice based on the mechanical resistance required, generally from 1 to 5 windings, preferably from 2 to 4. The starting wrapping edge shall not coincided with the end edge but shall overlap it by 5 to 10 cm, to ensure the greatest belt tensile strength. Any possible excess thickness owing to the overlapping may be eliminated by successive grinding treatment on the finished belt.

The alternating, overlaid layers of fabric (1) and fibre veils (4) are then needled together using barbed needles in a process which is generally known as needling. To this aim, the overlaid layers of fabric (1) and fibre veil (4) are repeatedly fed under the needles of a needling machine.

This machine consists of a support plate (7) and a needle head plate (8) with vertical movement. The barbed needles penetrate right through the fabric veil layer, hook the fibres and pull them through or partially through the veil (4) and the fabric (1) thus creating interwoven and interbound points or areas of fibres which are bound to the fabric (1).

The support base thus achieved, made of the fabric (1) or the bound multi-layer, fabric-fibre veil, is then impregnated with silicon rubber or heat-resistant resin, so as to obtain a heat protection or insulating barrier to the monofilaments and to the multifilaments.

Impregnation is performed by immersion or by spreading. The thickness of the silicon rubber or the resin may be between 0.1 and 3 mm. One may use both silicon rubber which vulcanise at room temperature or those that vulcanise at high temperature.

Examples of known silicone rubber products on the market are ELASTOSTIL E 50 and E 70 produced and sold by Wacker Chemie and type 3-7044 TEXTILE RTV, produced and sold by Dow Corning. After impregnation, the rubber or resin is vulcanised.

After impregnation or vulcanisation, the belt is placed onto the stretching rollers (2a, 2b, 2c) and a further synthetic staple-fibre veil (4') is fed onto the exposed surface. Preferably, more than one carded veil, overlaid and crossed (4') shall be fed onto the belt.

The staple-fibre veil or veils (4') are consolidated so as to create a felt structure, completely bound to the support base and covered or impregnated with silicon rubber or resin by a further needling process. The compactness and density of the fibre veil (4') depends on the number of needle strokes or runs through the bound material. The number of strokes generally varies between 800 and 3000 $cm^2$. The insulation offered by the fibre veil (4') increases with their compactness or density and thus by the number of stokes per square centimetre.

Once the needling treatment has been completed, the needled belt (5), made of layers of fabric (1), the interlining veils (4) and the needled, compacted surface veil (4') is then removed from the stretching rollers (2a, 2b, 2c) and thermostabilised under tension. Thermostabilisation may be performed on calenders fitted with diathermic oil heated cylinders (9) or by infrared panels (10). The treatment temperature should be at least 150° C. and up to the highest bearable temperature of the monofilaments or by the belts fibres; the tension may reach 200 kg/cm. This thermofixing treatment eliminates any possible belt elongation or deformation under working conditions. Thermofixing is generally performed at a higher tension than the belt is exerted to under working conditions.

The thermofixed belt (5) successively undergoes press compacting treatment is a heated plate press (11). The compacting treatment is performed by running the belt (5), on rollers (12), through the press pressure plates (11) at set length at a time. The pressure plate temperature is set between 150° and 260° C. and the pressing pressure may vary between 5 and 50 $kg/cm^2$.

This compacting treatment allows for an increase in the belt (6) density of 15 to 30% and, particularly, the compacted needled surface layer (4') thus increases the insulating protection that the layer offers the support fabric. Furthermore, the increase in belt density reduces wear on the working surface, improves belt resistance to cuts and abrasions caused by the sharp edges of bars and maintains belt thickness longer, thus stopping the bars from rubbing against the sides of the support plate owing to a reduction in belt thickness.

The belt density may be further increased by applying, before the compacting treatment, a resin, cross-linking agent or heat-resistant fixer, for example the silicon resin emulsion SILRES M 42 E as produced and sold by Wacker Chemie.

A final grinding treatment will eliminate any overlapping thickness and make the surface smoother.

The belts can be manufactured to the width required or, preferably, for economical reasons, they may be manufactured to the maximum width allowed by the needling machine, spreading machine, thermostabilising and pressing machine and then cut to the required width. The pads can be produced by cutting the belts.

The edges of the belts or pads may be, if required, heat welded or resin coated to avoid fraying.

Though the herein invention has been hereabove described with reference to one of the possible uses, the transport and support means pertaining to the herein invention may have numerous other potential applications; for example, to transport ceramic and glass products as well as other high temperature products such as silica sand in the electrometallurgy industry, or the fabric transfer-printing process.

Changes and adjustments, within the scope and spirit of the herein invention, may be introduced in order to achieve the herein invention as defined by the following Patent Claims.

I claim:

1. A transport and support means for heavy high temperature articles which includes:
   (a) a flexible support base made of a woven fabric (1) with a heat resistance of at least 150° C., and
   (b) a veil or layer (4') of synthetic staple heat resistant fibres needled to at least one surface of the flexible support base, where the flexible support base is made of at least one weft woven fabric (1), one or more ply (1a, 1b, 1c), using rigid, synthetic monofilaments with a diameter between 0.1 and 1.0 mm and warp woven using parallel, twisted or braided synthetic multifilaments (1d) and where the aforementioned support base has been treated with a silicon rubber or with a heat-resistant resin and then vulcanised.

2. The transport and support means according to claim 1 wherein the flexible support base is made of a single fabric (1), one or more ply (1a, 1b, 1c), using rigid, synthetic monofilaments with a diameter between 0.1 and 1.0 mm and warp woven using parallel, twisted or braided synthetic multifilaments (1d).

3. The transport and support means according to claim 1 wherein the flexible support base is made of a number of fabrics, one or more ply (1a, 1b, 1c), in weft using rigid synthetic monofilaments with a diameter between 0.1 and 1.0 mm and warp woven using parallel, twisted or braided synthetic multifilaments (1d) and alternating with synthetic staple-fibre veils; the said overlaid veils and fabrics shall be needled together.

4. The transport and support means according to claim 1 wherein the number of ply (1a, 1b, 1c) making up the fabric (1) is between 1 and 5, preferably between 2 and 4.

5. The transport and support means according to claim 1 wherein the synthetic monofilament has a heat resistance of at least 150° C. and may be chosen from among the synthetic monofilament polyesters, polyheteroheteroketonics and polyamides with a strength of at least 4.5 g/den and an elongation at break of between 5 and 20%.

6. The transport and support means according to claim 1 wherein the synthetic monofilament has a count of between 1000 and 2000 den and is made of aromatic polyamide fibres.

7. The transport and support means according to claim 1 wherein the number of weft woven monofilaments is between 5 and 20 cm and the number of warp woven inonofilaments is between 10 and 30 cm.

8. The transport and support means according to claim 1 wherein the staple, synthetic fibres have been chosen from the aromatic polyamides and the polybenzimidazoles.

9. The transport and support means according to claim 1 wherein the thickness of the silicone rubber or the resin layer is between 0.1 and 3 mm.

10. The transport and support means according to claim 1 characterised in that it has been thermofixed under tension with loads up to 200 kg/cm at a temperature of between 150° C. and the maximum bearable temperature for the least heat resistant fibres.

11. The transport and support means according to claim 1 aforementioned Patent Claims, characterised in that it has been press compacted at a temperature of 150°–260° C. and at a pressure of between 5 and 50 $kg/cm^2$.

12. A manufacturing process for the transport and support means for heavy, high-temperature articles, according to claim 1 consisting in:

- winding onto stretching roller (2a, 2b, 2c), set at the distance from one to the other to obtain the belt circumference required, a support base made of at least one weft woven fabric (1), one or more ply (1a, 1b, 1c), using rigid, synthetic monofilaments with a diameter between 0.1 and 1.0 mm and warp woven using parallel, twisted or braided synthetic multifilaments (1d) and where the aforementioned support base has been treated with a 0.1 to 3 mm thick layer of silicon rubber or heat resistant resin and then vulcanised;
- feeding one or more staple synthetic fibres veils (4'), carded, overlaid and crossed, onto the exposed surface of the aforementioned fabric;
- needling the overlaid fabric (1)- veil (4') at a temperature of at least 150° C. and up to the maximum bearable temperature of the monofilaments and the fibres and at a greater tension than the belt will be used at under normal working conditions;
- compacting the thermofixed belt at a pressure of between 5 and 50 kg/cm$^2$ and at a temperature of between 150° and 260° C.; and
- grinding the external surface if needed.

13. The process according to claim 12, where the support base is achieved by feeding onto stretching rollers (2a, 2b, 2c), set at the distance required from one to the other to obtain the belt circumference required, a fabric (1), one or more ply (1a, 1b, 1c), using rigid, synthetic monofilaments with a diameter between 0.1 and 1.00 mm and warp woven using parallel, twisted or braided synthetic multifilaments (1d) and a synthetic, staple-fibre veil (4). The aforementioned alternating, overlaid fabric and veil structure is then wrapped 1 to 5 times around the rollers and then bound and needled together.

14. The process according to claim 12, where the fabric-veil structure is made of from 2 to 4 layers.

15. The method of transporting by means of the transport and support means according to claim 1 extruded aluminum products at the extrusion head of the extrusion press.

* * * * *